(12) United States Patent
Lewis

(10) Patent No.: US 6,751,369 B1
(45) Date of Patent: Jun. 15, 2004

(54) FIBER LENS ASSEMBLY FOR SINGLEMODE OPTICAL SWITCHES

(75) Inventor: Norris E. Lewis, Christiansburg, VA (US)

(73) Assignee: Moog Components Group Inc., East Aurora, NY (US)

( * ) Notice: Subject to any disclaimer, the term of this patent is extended or adjusted under 35 U.S.C. 154(b) by 22 days.

(21) Appl. No.: 09/628,015

(22) Filed: Jul. 28, 2000

(51) Int. Cl.[7] ............................. G02B 6/26; G02B 6/42
(52) U.S. Cl. ........................................... 385/18; 385/33
(58) Field of Search .......................... 385/15, 16, 18, 385/25, 33, 34, 35

(56) References Cited

U.S. PATENT DOCUMENTS

| | | | |
|---|---|---|---|
| 4,327,963 A | * 5/1982 | Khoe et al. ................ 385/35 |
| 4,701,011 A | 10/1987 | Emkey et al. .............. 385/34 |
| 4,932,745 A | 6/1990 | Blonder ..................... 385/18 |
| 4,946,236 A | 8/1990 | Dautartas et al. .......... 385/17 |
| 5,042,889 A | 8/1991 | Benzoni .................... 385/16 |
| 5,477,323 A | 12/1995 | Andrews et al. | |
| 5,940,554 A | 8/1999 | Chang et al. | |
| 6,014,483 A | 1/2000 | Thual et al. ................ 385/33 |
| 6,094,293 A | 7/2000 | Yokoyama et al. | |
| 6,259,835 B1 | * 7/2001 | Jing ........................... 385/18 |
| 6,396,975 B1 | * 5/2002 | Wood et al. ................ 385/18 |

FOREIGN PATENT DOCUMENTS

EP      0 410 619 A2    1/1991

OTHER PUBLICATIONS

Kishimoto, R. "Design for single-mode optical fiber switch", Electronics and Communications in Japan Part 2, vol. 69, No. 9 (1986), pp. 20–31.*

* cited by examiner

*Primary Examiner*—Drew Dunn
*Assistant Examiner*—Alessandro Amari
(74) *Attorney, Agent, or Firm*—Guy R. Gosnell; Phillips Lytle LLP

(57) ABSTRACT

An m-input/n-output (e.g. 1×1, 1×2, 2×2) optical fiber switch includes a switch substrate formed with v-grooves in which singlemode fibers are disposed with their ends operatively arranged in relation to a deflecting mirror to transmit or receive optical signals. To prevent misalignment between the optical paths defined by these singlemode fibers, a lens is fused to directly to each of the singlemode fiber ends to eliminate the need for separate collimating lens and create a stable and dimensionally invariable interface between the fiber and the lens, resulting in a more compact optical switch arrangement.

20 Claims, 3 Drawing Sheets

FIBER LENS ASSEMBLY FOR SINGLEMODE OPTICAL SWITCHES

TECHNICAL FIELD

The present invention relates generally to optical switches and, more particularly, to the novel employment of fiber lens assemblies in singlemode optical switch designs.

BACKGROUND ART

Optical switches are commonly used in optical communication networks to switch an optical signal from one path to another. In one form of optical switch to which this invention is directed, optical waveguides or fibers terminate within a switch body where mirror elements are moveable to switch the optical signal path from input fibers in order to redirect the optical signal path to one or more output fibers.

An exemplary optical switch is disclosed in U.S. Pat. No. 4,932,745 to Blonder, assigned to AT&T, the disclosure of which is incorporated by reference herein in its entirety. In this '745 patent, an optical switching arrangement has a mirror which is positioned either out of an optical path or in an optical path to deflect optical signals between input and output fibers. The switching arrangement has first, second, third and fourth optical ports which are formed by respective proximate ends of first, second, third and fourth optical fiber segments disposed in respective grooves etched or otherwise formed in, for example, a silicon substrate base. The switching arrangement further comprises first, second, third and fourth lenslets that serve to collimate the respective optical beams emanating from the first fiber, entering into the second fiber, or entering into the third or fourth fibers. Optical radiation for these optical beams is supplied by a light source (not shown) and is collected in a known manner. The mirror has a frontal planar reflecting surface and may also have another reflecting surface parallel thereto, such as a rear planar reflecting surface.

As mentioned above, the foregoing switching arrangement can be integrated into a silicon workbench technology assembly in order to form an optical switching assembly. This optical switching arrangement may be employed in an optical switch 10 disclosed, for example, in FIGS. 1, 2 and 5 of the instant application in which there is depicted an exemplary electromagnetic-based activation mechanism 12 used to actuate movement of the mirror 14 (normally biased with a spring 16) through a spring to switch optical signals traveling along one of incoming optical waveguides 18a disposed within the substrate switching base 20. More specifically, with reference to FIG. 1, the substrate base 20 typically has a major planar surface 22 in which first, second, third and fourth waveguide alignment grooves 24a, 24b, 24c, and 24d are formed to receive the respective optical fibers 18a, 18b, 18c and 18d. A respective lens alignment recess (e.g. of pyramidal shape) 26a, 26b, 26c and 26d is disposed at the respective end of each waveguide groove 24a–24d (see FIG. 1) to receive a ball lens 28 (FIG. 2) to collimate the incoming (18a) or outgoing (18d) optical beam. A simple optical beam switching or rerouting is achieved by moving the mirror 14 into a beam deflecting position (in which the incoming path (18a) is deflected to a non-aligned outgoing fiber (18d)) or a non-deflecting position in which the incoming beam passes into an aligned outgoing beam 18c after passing through both collimating lens 28 respectively associated therewith. While the illustrated switch design is a 2×2-switch configuration, the present invention has applicability to 1×1, 1×2 and other higher order matrix switch configurations as well.

Since the light rays are collimated and transmitted across a gap from one fiber 18a and 18b through their associated pair of lenses 28 which focuses the light to the receiving fiber 18c and 18d, it is extremely important that the fiber optic mounting grooves 24a–24d and lens mounting recesses 26a–26d be machined to provide a high degree of alignment and thereby eliminate insertion losses occurring as a result of, for example, dimensional variations in the respective grooves/lens mounting recesses that otherwise impede the ability of the entire signal to be transmitted between fiber ends as a result of misalignment.

The foregoing optical switch designs work generally well with multimode fibers that are typically of large diameter (e.g. 50 micrometer cores) since the dimensional variations that exist between the fiber optic mounting grooves 24a–24d and ball mounting recesses 26a–26d are generally insufficient to give rise to unacceptable insertion losses given the relatively large core diameter of the multimode fiber. However, in the case of singlemode fibers in which the cores are much smaller than the multimode fibers (e.g. singlemode fiber cores are typically 8–10 micrometers), insertion losses are unacceptably high with the foregoing switch design since the dimensional variations between the fiber mounting and lens mounting recesses 24a–24d and 26a–26d that were acceptable for multimode switches are unacceptable for singlemode switches. From FIG. 2, it is apparent that four sources of dimensional variation exist which are lens diameter, lens pocket dimensions, fiber diameter, and V-groove dimensions. If only one of these dimensions is out of tolerance, this variation or misalignment will produced misalignment in the entire system.

It is accordingly an object of the present invention to improve the design of singlemode optical switches to minimize insertion losses.

Another object is to improve singlemode optical switches that utilize singlemode collimators to configure higher order matrix switch designs while maintaining acceptable low insertion losses.

Another object is to design a singlemode optical switch having insertion losses as low as 0.3 dB for 1×1, 1×2, and 2×2 switch configurations.

Another object is to manufacture a singlemode optical switch with fewer dimensional tolerances that would otherwise cause rejection of manufactured product.

DISCLOSURE OF THE INVENTION

The present invention concerns an optical switch utilizing a reflecting element to redirect optical signals between a plurality of different singlemode waveguides. The singlemode optical waveguides are mounted to a switch substrate wherein at least one of the waveguides is an input waveguide and another of the waveguides is an output waveguide. In accordance with the invention, each waveguide has a separate collimating lens section attached directly to an endface of the waveguide, advantageously eliminating dimensional variations and misalignment that would otherwise occur by mounting separate collimating lens within the switch substrate as known in the prior art.

The optical fiber switch with the fused fiber lens assemblies fused directly to the singlemode fibers may have m-input/n-output fibers for 1×1, 1×2, and 2×2 switch configurations, as well as other higher order matrix switch configurations while maintaining acceptable low insertion losses.

Insertion losses are kept to a minimum since the plurality of waveguides are respectively disposed in grooves formed in the switch substrate with the associated lens formed in the same groove eliminating the need for separate lens receiving pockets that disadvantageously give rise to dimensional variation.

In the preferred embodiment, each collimating lens is preferably a multimode fiber attached to the end of the singlemode fiber. A preferred form of attachment is fusion splicing.

The multimode fiber lens is a graded index multimode fiber that may have a step index section fused directly to the singlemode fiber end.

Since the collimating fiber lens assemblies according to the invention are short lengths of fiber (e.g. graded index or graded index and step index) which have been fusion spliced to the end of the single mode fiber, use of the smallest collimators advantageously allows the physical dimensions of the optical switch to be reduced to a minimum so that the switch or multiple switches may be attached to a circuit board or be placed in an enclosure with a minimum of volume. This is an extremely important consideration for the telecom and datacom industries.

Other and further aspects of the present invention will become apparent during the course of the following description and by reference to the accompanying drawings.

BRIEF DESCRIPTION OF THE INVENTION

BEST MODE FOR CARRYING OUT THE INVENTION

Figure 1:
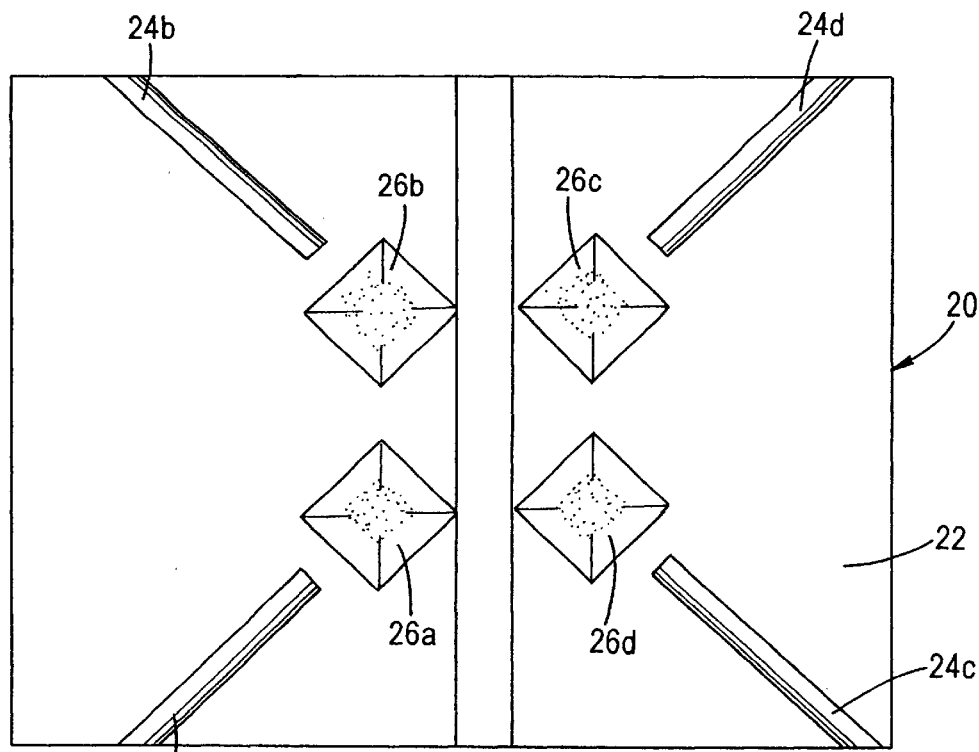
FIG. 1 is an illustration of a conventional substrate base design for use in an optical bypass switch without the fiber and collimating lens assemblies in place.
Figure 2:
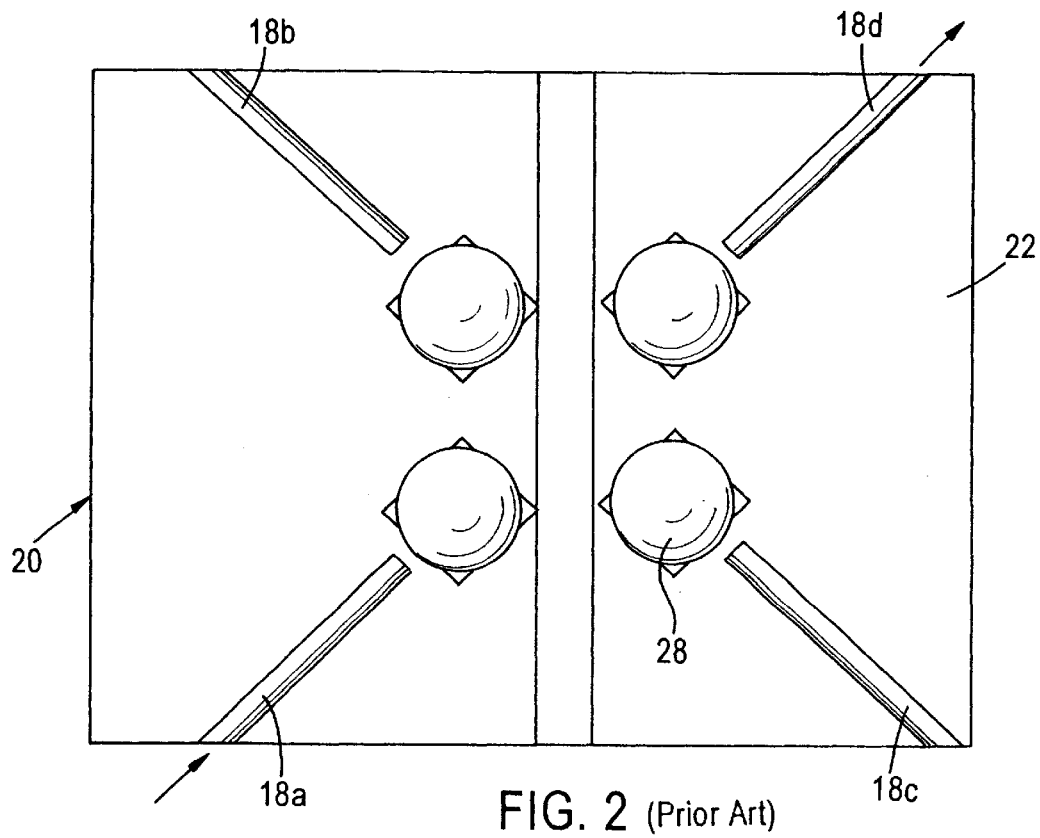
FIG. 2 is a view similar to FIG. 1 of the conventional design with the optical fibers and collimating lens in place.
Figure 3:
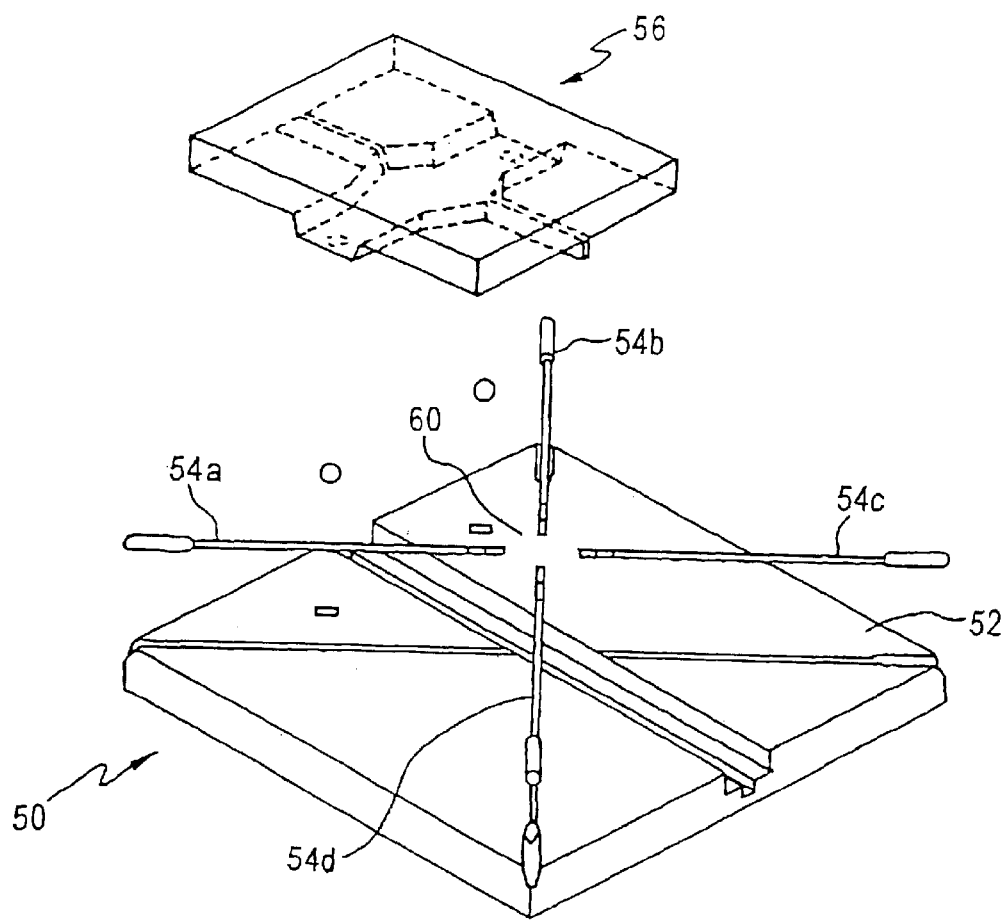
FIG. 3 is a perspective view of a substrate base of an optical switch in accordance with a preferred embodiment of the present invention.
Figure 4:
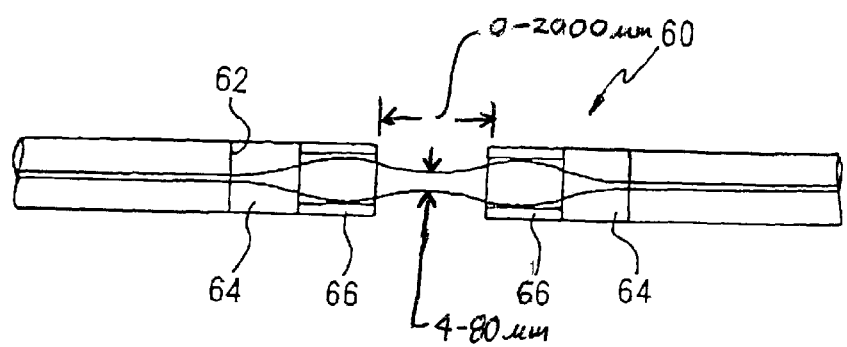
FIG. 4 is a plan view of an interface between a singlemode fiber and the multimode fiber lens attached thereto.

FIG. 3 is an illustration of an exemplary 2×2 optical bypass switch base assembly 50 in which a silicon micromachined substrate base 52 is used to locate four (4) optic singlemode fibers 54a, 54b, 54c and 54d in operative association with a moving mirror 56 of a type that can be used in association with an electromagnetic actuator 12 (see e.g. FIG. 5) which is similar to a type of optical switch disclosed, for example, in U.S. Pat. No. 5,042,889, assigned to AT&T, the disclosure of which is incorporated by reference herein in its entirety. In accordance with the unique features described more fully below, the collimating lens assembly, generally designated with reference numeral 60, is associated with each of the incoming and outgoing optical fibers 54a–54d and attached directly to the associated singlemode fiber endface 62 (see e.g. FIG. 4), wherein the spacing between the end faces of the input and output waveguides is not longer than 2,000 microns, i.e., 2 mm and the beam waist measures from about 4 microns to about 80 microns advantageously resulting in a structure that minimizes dimensional variation and provides for low insertions losses.

Figure 5:
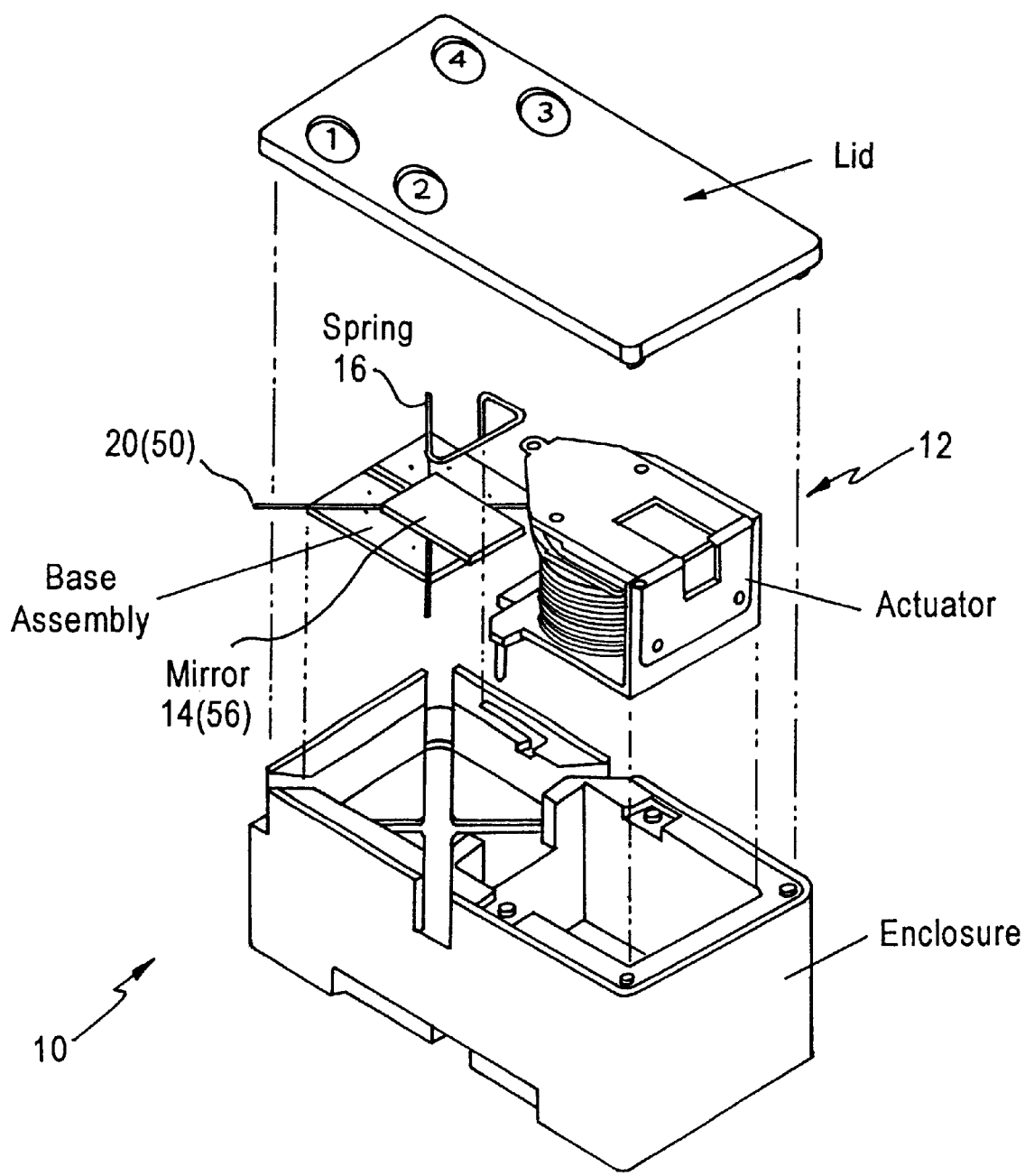
FIG. 5 is a perspective view of an exemplary optical switch arrangement containing either the switch base of the present invention or a conventional switch base.

The exemplary optical fiber switch 10 depicted in FIG. 5, which may incorporate the singlemode optical switch base assembly 50 of the present invention, includes an exemplary electromagnetic-based activation mechanism 12 as described more fully below. The portion of the switch holding the actual singlemode fibers 54a–54c, referred to as the switch substrate 52, is illustrated more clearly in FIG. 3 and will be described in detail below. It is to be understood that the use of the activation mechanism 12 is exemplary only and other types of activation mechanisms may be used in combination with the switch. The present invention is preferred for use with singlemode fibers 54a–54c and therefore singlemode switches that utilize singlemode collimators. However, the invention may also be used with multimode fibers as well, although the significant advantages of the invention are generally better realized with the singlemode fibers wherein dimensional variation based problems are more evident.

The optical switch 10 includes activation mechanism 12 which functions to move a reflecting element 56 out of its redirecting position upon application of an electrical signal is also well known. In particular, the activation mechanism 12 in the preferred embodiment includes an electromagnetic comprising a ferromagnetic core and a wire coil which is wound around the core. As is well known in the art, the application of an electrical signal (e.g. voltage) to the coil will create magnetic field intensity. This causes at least a portion of the reflecting element 56 located in proximity to the core and which is coated with a ferromagnetic material to be attracted to the core in the presence of the induced field. Other types of activation mechanisms as known in the art may be used as well.

As discussed above, the present invention is directed to an optical lens or coupler which utilizes a section of multimode fiber as a lens that can be directly fused onto the endface of the transmission or input fiber which is preferably a singlemode fiber. In the practice of this invention, many types of multimode fibers may be utilized, two examples being a step-index multimode fiber and a graded-index multimode fiber. As is well known in the art, "step-index" refers to a fiber which comprises a core region having a refractive index $n_0$ and a cladding region having a refractive index $n_1$, where $n_0 > n_1$ and a definite "step" exists between the indices of these two regions. A graded-index fiber, on the other hand, is defined as a fiber with an index of refraction that is a function of the various glass that is used to form the concentric layers of core and cladding in a fiber, thus providing a more gradual change in refractive index that the step-index fiber.

The step-index fiber and graded-index multimode fiber sections may be of a type as disclosed in U.S. Pat. No. 4,701,011 to Emkey et al, or U.S. Pat. No. 6,041,483 to Thual et al or "Collective Micro-Optics on Fiber Ribbon for Optical Interconnecting Devices" by P. Chanclou et al (France Telecom, CNET, DTD/PIH), the disclosures of which are incorporated by reference herein in their entireties. Briefly, however, silicon and graded-index sections 64 and 66 are attached to the endface of the associated singlemode fiber 62 in that order to obtain the desired collimating effects wherein the role of the silica section is to expand the optical beam from the singlemode fiber to the graded-index section and to make possible the optimization of the spot size at the endface of the micro optics and to maintain and align the graded-index section at the appropriate distance from the singlemode fiber. The respective lengths of these sections 64 and 66 may be selected by persons skilled in the art by reference to the foregoing publications and patents without undue experimentation.

The singlemode optical switch constructed in accordance with the above teachings will advantageously permit a monolithic actuator-mirror structure to replace the current electromagnetic-based activation mechanism. One limitation of known actuator-mirror mechanisms is the limited travel (50–75 μ) that can be produced at acceptable voltages and currents. The fiber lens combination of the present invention, on the other hand, produces a collimated beam diameter that is much smaller than that produced by the traditional collimating lenses that are used today.

What is claimed is:

1. An optical switching arrangement comprising:
   a) an optical deflecting element having a deflecting surface;
   b) a moving mechanism arranged for moving the deflecting element such that the deflecting surface thereof can be moved between a first position and a second position; and
   c) a substrate having a planar surface and at least first and second waveguide alignment recesses therein at the surface thereof adapted to receive first and second waveguides, respectively, one of said waveguides being an input waveguide and the other waveguide being an output waveguide, each said waveguide having a singlemode waveguide and a separate collimating lens section attached directly to an end of the associated singlemode waveguide,
      wherein a length of an optical path defined between endfaces of said input and output waveguides is not longer than 2 mm, and wherein a diameter of a beam waist as measured in a central portion of said optical path is from about 4 to 80 μm.

2. The arrangement of claim 1, wherein each said singlemode waveguide is a singlemode optical fiber, said lens is a multimode optical fiber attached to the end of the singlemode fiber, and the multimode fiber has a step index section and a graded index section.

3. The arrangement of claim 1, wherein,
   each said singlemode waveguide is a singlemode fiber, said lens is a separate section of multimode fiber of a predetermined length and including an end face being fused to said singlemode fiber to provide coupling therebetween,
   the section of multimode fiber comprises a predetermined length of step index multimode fiber that includes said end face fused to the singlemode fiber and an opposite endface remote from said endface,
   said opposite endface is attached to a graded index fiber section forming a part of said multimode fiber lens.

4. The arrangement of claim 1 wherein light is coupled from the input waveguide to the output waveguide via the deflecting element when the deflecting surface is at the first position, and is not coupled from the input waveguide to the output waveguide when the deflecting surface is at the second position, and wherein the moving mechanism moves the deflecting element such that the deflecting surface of said deflecting element travels less than 75 μm between the first and second positions.

5. An optical switching arrangement comprising:
   a) an optical deflecting element having a deflecting surface;
   b) a moving mechanism arranged for moving the deflecting element such that the deflecting surface thereof can be moved between a first position and a second position; and
   c) a substrate having a planar surface and at least first and second waveguide alignment recesses therein at the surface thereof adapted to receive first and second waveguides, respectively, one of said waveguides being an input waveguide and the other waveguide being an output waveguide, each said waveguide having a singlemode waveguide and a separate collimating lens section attached directly to an end of the associated singlemode waveguide,
      wherein a length of an optical path defined between endfaces of said input and output waveguides is not longer than 2 mm;
      wherein light is coupled from the input waveguide to the output waveguide via the deflecting element when the deflecting surface is at the first position, and is not coupled from the input waveguide to the output waveguide when the deflecting surface is at the second-position;
      wherein the moving mechanism moves the deflecting element such that the deflecting surface of said deflecting element travels less than 75 μm between the first and second positions.

6. The arrangement of claim 5, wherein each waveguide is a singlemode optical fiber and said lens is a multimode optical fiber attached to the end of the singlemode fiber that forms one of the singlemode waveguides.

7. The arrangement of claim 6, wherein said multimode fiber lens is fusion spliced to the end of the singlemode fiber.

8. The arrangement of claim 6, wherein said multimode fiber is a graded index fiber.

9. The arrangement of claim 6, wherein the multimode fiber lens has a step index section and a graded index section.

10. The arrangement of claim 6, wherein said multimode fiber lens has the same outer diameter as the singlemode fiber to which it is attached.

11. The arrangement of claim 5, wherein each waveguide is a singlemode optical fiber and said lens is a multimode optical fiber attached to the end of the singlemode fiber that forms one of the singlemode waveguides, wherein said switch substrate is formed without any lens receiving recesses that would be formed to accommodate any lens structures that are separate and apart from one of the singlemode fibers.

12. The arrangement of claim 5, wherein each singlemode waveguide is a singlemode fiber, and each lens is a separate section of multimode fiber of a predetermined length and including a first end face and a second end face, the first end face of said multimode fiber being fused to said input singlemode fiber to provide coupling therebetween.

13. The arrangement of claim 12, wherein the section of multimode fiber comprises a predetermined length of step index multimode fiber and wherein the step index multimode fiber includes said first endface fused to the singlemode fiber and has a second endface remote from the first endface.

14. The arrangement of claim 5, wherein each singlemode waveguide is a singlemode fiber, and each lens is a separate section of multimode fiber of a predetermined length and including a first end face and a second end face, the first end face of said multimode fiber being fused to said input singlemode fiber to provide coupling therebetween,
   wherein the section of multimode fiber comprises a predetermined length of step index multimode fiber and wherein the step index multimode fiber includes said first endface fused to the singlemode fiber and has a second endface remote from the first endface,
   wherein said second endface is attached to a graded index fiber section forming a part of said multimode fiber lens.

15. An optical switch comprising:

a switch substrate;

a plurality of optical waveguides mounted upon said switch substrate, each optical waveguide comprising a singlemode waveguide and an integral collimating lens section at an end of the associated singlemode waveguide, wherein a length of an optical path defined between endfaces of a pair of waveguides is not longer than 2 mm; and a monolithic actuator-mirror structure comprising an actuator and a mirror for selectively deflecting light emitted by a respective optical waveguide, wherein light is coupled from an input waveguide to an output waveguide via the mirror when the mirror is at a first position, and is not coupled from the input waveguide to the output waveguide when the mirror is at a second position;

wherein the actuator moves the mirror such that the mirror travels less than 75 $\mu$m between the first and second positions.

16. An optical switch according to claim 15 wherein said switch substrate defines a plurality of grooves, and wherein said plurality of optical waveguides are disposed in respective grooves with the collimating lens section disposed within the same groove as the associated singlemode waveguide.

17. An optical switch according to claim 15 wherein the collimating lens section of each optical waveguide comprises a multimode optical fiber.

18. An optical switch according to claim 17 wherein the multimode optical fiber comprises a graded index fiber.

19. An optical switch according to claim 17 wherein the multimode optical fiber comprises a step index section and a graded index section.

20. An optical switch according to claim 15 wherein the collimating lens section of each optical waveguide is fusion spliced to the end of the associated singlemode waveguide.

* * * * *